United States Patent Office 3,711,305
Patented Jan. 16, 1973

3,711,305
COMPOSITIONS FOR SEALING LEAKS
Amos R. Anderson, Adrian, Mich., assignor to
Joseph J. Packo
No Drawing. Original application Aug. 20, 1969, Ser. No. 851,734, now Patent No. 3,608,000, dated Sept. 21, 1971. Divided and this application Jan. 20, 1971, Ser. No. 108,205
Int. Cl. C09k 3/10, 3/12
U.S. Cl. 106—33                                    9 Claims

ABSTRACT OF THE DISCLOSURE

The invention relates to composition for sealing leaks in pipes, conduits, gas lines, closed containers, tanks and the like. The interior of such equipment is first purged with a non-reactive dry gas, such as nitrogen, to remove any moisture and/or oxygen which may be present. Then the sealant composition is introduced into the interior of the equipment in a suitable inert gas vehicle under pressure. The sealant composition in the gas vehicle will escape from any leaks present in the equipment into the outer ambient atmosphere or adjacent soil in the case of pipe lines buried in soil. The sealant reacts with oxygen and/or moisture to form at the situs of the leak a solid reaction product. The sealant composition comprises (1) a volatile metal alkyl compound, and (2) a volatile organo-silane compound. The volatile metal alkyl compound has the formula $M(R)_2$, wherein M is zinc or cadmium, or the formula $X(R)_3$, wherein X is aluminum, gallium, indium, or thallium, and R is an alkyl having 1 to 3 carbon atoms. The organo-silane compound has the formula $R_{4-n}Si(OR')_n$, wherein R is an alkyl having 1 to 3 carbon atoms, R' is an alkyl having 1 to 3 carbon atoms, and n is an integer from 1 to 4. The proportions of the metal alkyl compound may range by volume from about 1% to about 99%, the remainder being the organo-silane compound.

An illustrative sealant composition is a mixture by volume of 80% tetraethoxysilane and 20% diethyl zinc which is introduced in a stream of nitrogen into a pipe line under pressure to seal existing leaks. The sealant compositions are supplied to the interior of the apparatus or vessel which may contain leaks in sufficient concentration and suitable pressure so that upon escape from the leaks a solid seal will form in situ.

CROSS-REFERENCE TO RELATED APPLICATION

This application is a division of copending application Ser. No. 851,734, filed Aug. 20, 1969, now U.S. Pat. 3,608,000, issued Sept. 21, 1971.

FIELD OF THE INVENTION

The invention relates to sealing leaks in pipes, conduits, closed containers, tanks, and closed systems adapted to contain fluids therein, hereinafter referred to generally as "vessel." The invention is particularly adapted for sealing leaks in buried underground piping systems used for conveying fuel gas and also for sealing leaks in telephone and electrical conduits containing nitrogen or other inert gas under pressure.

SUMMARY OF THE INVENTION

According to this invention the interior of the vessel is first purged with a dry non-reactive gas, such as nitrogen, to remove moisture and/or oxygen present. The sealant composition is then introduced into the interior of the vessel under pressure in gaseous form or in a suitable inert gaseous vehicle. When the sealant composition escapes through any existing leak in the vessel it reacts with oxygen and moisture present at the exterior locus of the vessel where the leak exists and forms a solid product in situ which seals the leak. The sealant compositions consist essentially of (1) a volatile metal alkyl compound, and (2) a volatile organo-silane compound. These sealant compositions are introduced into the vessel in a non-reactive vehicle gas, such as hydrogen, helium or nitrogen in an amount so that upon escape of the admixed gas from a leak into the atmosphere a seal will be produced. These sealant agents are substances which are easily volatilized and which can be admixed with the inert vehicle gas and carried along with the gas in the vessel.

The volatile metal alkyls suitable for the present invention have the formula: MRR', wherein M is zinc or cadmium, R and R' is a straight or branched chain alkyl having 1 to 3 carbon atoms, R and R' being identical or different. Specific examples are dimethyl zinc, diethyl zinc, methyl ethyl zinc, methyl propyl zinc, diisopropyl zinc and dipropyl zinc. Corresponding alkyl cadmium compounds such as dimethyl cadmium, etc., may also be used.

Other suitable volatile metal alkyls which can also be used for the formula: $X(R)_3$, wherein X is aluminum, indium, gallium or thallium and R is a straight or branched chain alkyl having 1 to 3 carbon atoms, the alkyls being identical or different. Examples of such compounds are trimethyl aluminum, triethyl aluminum, methyl diethyl aluminum, dimethyl ethyl aluminum, tripropyl aluminum, triisopropyl aluminum, and methyl diisopropyl aluminum and similar alkyls of gallium, indium or thallium.

The aforementioned volatile metal alkyls may be used singly or in mixtures thereof.

The volatile organo-silanes have the formula $$R_{4-n}Si(OR')_n$$

wherein R and R' is a straight or branched chain alkyl having 1 to 3 carbon atoms, all the alkyls being identical or different, and n is an integer from 1 to 4. Specific examples are trimethyl ethoxy silane, dimethyl diethoxy silane, propyl trimethoxy silane, diisopropoxy dimethoxy silane. These volatile silanes may be used singly or in mixtures thereof with the volatile metal alkyls previously described.

The proportions of the volatile metal alkyls and volatile organo-silanes may be varied over a wide range depending upon the partial vapor pressure of the specific volatilized components. In general, the proportions of the metal alkyl compound may range from about 1% to about 99% by volume, the remainder being the organo-silane compound. It is preferred to keep the metal alkyl concentration below 30% by volume in the sealant composition, although higher concentrations may be used, keeping in mind that such higher concentrations may result in pyrophoric compositions which are difficult to handle. Furthermore, inasmuch as the organo-silanes are generally less volatile than metal alkyls, a greater quantity of the organo-silanes will result in a more even distribution in the vessel or pipe line of the components of the sealant composition due to differences in their vapor pressures. The sealant compositions are not simple mixtures of the organo-metallic compounds but in many cases undergo complex interchange reactions which may be generalized as follows:

$$AlR_3 + Si(OR)_4 = R_2AlOR + RSi(OR)_3$$

$$ZnR_2 + RSi(OR)_3 = RZnOR + R_2Si(OR)_2$$

When such products as well as any of the original components escape from a leak they will react with oxygen or moisture present at the situs of the leak to form complex solid reaction products that seal the leak. Also in the case of vessels or pipe lines buried in the soil the escaping sealant compositions will react with the oxygen or moisture present in the soil at the situs of the leak and form a solid seal while at the same time the soil adjacent the solid seal will provide a matrix or reinforcement for the seal.

As stated previously the concentration of the two volatile sealant components used and the pressure of the vehicle gas used may be varied over a wide range depending upon the specific components used, the nature and size of the leaks which are to be sealed and the environmental conditions of the particular vessel and the like. The time of flow of the sealant composition can also be greatly varied accordingly in order to seal existing leaks.

If desired, the sealant compositions may be supplied to the user in containers or cylinders mixed in the proportions required for specific sealing operations. The compositions may be introduced into the vessel and the like by suitable means in controlled or metered amounts in the vessel which has been previously flushed and dried with an inert gas. The inert gas and the added sealant composition are maintained at a suitable pressure for a sufficient period of time to seal any leak present. Also if desired, the user may be supplied with a suitable container having under pressure an inert gas and the selected sealant agents mixed therein in suitable proportions which can be introduced directly into the vessel and the like. Also if desired, the specific components of the sealant composition can be introduced in volatilized condition separately in controlled amounts in the vessel and the like in which the inert gas is present under suitable pressure.

ILLUSTRATIVE EMBODIMENTS OF THE INVENTION

Example 1

A steel pipe section (7 feet long, ¾″ diameter) was drilled with a ⅛″ hole to simulate a leak. The test pipe was buried under 30′ of clay loam soil of 6.3% moisture content. One end of the pipe was connected to a valve-controlled feed line connected to a source of dry nitrogen gas for purging the pipe of any moisture or oxygen, and also as an inert gas carrier for the sealant composition. The nitrogen line was also connected to a bubbler vessel containing the liquid sealant composition. Pressure and flow indicators and monitors were also connected in the feed line. The other end of the test pipe was connected to a valved outlet line connected to a pressure gage and pressure recorder. The test pipe was first purged with a stream of dry nitrogen gas to remove oxygen and moisture. A liquid mixture of 20% diethyl zinc and 80% tetraethoxy silane, by volume, was placed in a bubbler and nitrogen gas passed through the solution, at ambient temperatures, at a pressure of 1 p.s.i.g. The nitrogen gas, carrying the volatilized diethyl zinc and tetraethoxy silane vapors was passed into the test pipe until a seal was obtained. An effective seal was made after a 68 hour period in which the initial flow rate was 50 c.f.h. at 1# p.s.i.g. Pressure was kept constant and flow rate decreased as sealing took place. A final test to determine the effectiveness of the seal was made by increasing the nitrogen pressure on the system to 100 lbs. p.s.i.g. for a period of 24 hours. No leakage was indicated via the flow meter.

Example 2

A mixture of 20% diethyl zinc and 80% dimethyl diethoxy silane, by volume, was placed in the apparatus described above in Example 1 and nitrogen gas passed through the solution for a period of 192 hours. The moisture content of the soil was 6.2%. At the end of this period a seal was obtained which, upon testing, showed no leakage at 100 lbs. p.s.i.g. over a 24 hour period as indicated via the flow meter.

Example 3

A mixture of 20% diethyl zinc and 80% n-propyl trimethoxy silane, by volume, was placed in the apparatus described in Example 1 and nitrogen gas passed through the solution for a period of 216 hours. The moisture content of the soil was 6.2%. At the end of this period a seal was obtained which, upon testing at 100 lbs. p.s.i.g., gave no indication of leakage on the flow meter.

Example 4

A mixture of 20% diethyl zinc and 80% diisopropoxy dimethoxy silane, by volume, was placed in the apparatus described in Example 1 and nitrogen gas passed through the solution for a period of 190 hours. The moisture content of the soil was 3.6%. At the end of this time a seal was obtained which, upon testing at 100 lbs. p.s.i.g. for 24 hours, gave no indication of leak via the flow meter.

Example 5

A mixture of 20% triethyl aluminum and 80% tetraethoxy silane, by volume, was placed in the apparatus described in Example 1 and nitrogen gas passed through the solution for a period of 168 hours. The moisture content of the soil was 6.0%. At the end of this period a seal was obtained which, upon testing at 60 lbs. p.s.i.g. for 24 hours, gave no indication of leak via the flow meter.

Example 6

A mixture of 20% triethyl aluminum and 80% dimethyl diethoxy silane, by volume, was placed in the apparatus described in Example 1 and nitrogen gas passed through the solution for a period of 190 hours. The moisture content of the soil was 6.2%. At the end of this period a seal was obtained, which, upon testing at 60 lbs. p.s.i.g. for 24 hours, gave no indication of leak via the flow meter.

Example 7

A mixture of 20% triethyl aluminum and 80% n-propyl trimethoxy silane, by volume, was placed in the apparatus described in Example 1 and nitrogen gas passed through the solution for a period of 210 hours. The moisture content of the soil was 6.2%. At the end of this period a seal was obtained which, upon testing at 60 lbs. p.s.i.g. for 24 hours, gave no indication of leak via the flow meter.

Example 8

A mixture of 20% diethyl zinc and 80% trimethyl ethoxy silane, by volume, was placed in the apparatus described in Example 1 and nitrogen gas passed through the solution for a period of 190 hours. The moisture content of the soil was 6.2%. At the end of this time a seal was obtained which, upon testing at 100 lbs. p.s.i.g. for 24 hours, gave no indication of leak via the flow meter.

Example 9

A mixture of 5% diethyl zinc and 95% tetraethoxy silane, by volume, was placed in a bubbler and nitrogen gas passed through the solution, at ambient temperatures, at a pressure of 1 p.s.i.g. The nitrogen gas carrier which contains diethyl zinc and tetraethoxy silane vapors was passed into a pipe which was buried beneath the surface of the ground. A simulated leak consisted of a ⅛″ drilled hole. The soil was a clay loam, testing 6.3% moisture.

The vapors of the above sealant composition was passed into the pipe until a seal was obtained. An effective seal was made after a 214 hour period in which the initial flow rate was 50 c.f.h. at 1# p.s.i.g. Pressure was kept constant and flow rate decreased as sealing took place. A final test to determine the effectiveness of the seal was made by increasing the nitrogen pressure on the system to 100 lbs. p.s.i.g. for a period of 24 hours. No leakage was indicated via the flow meter.

ADVANTAGES

The present invention is particularly suitable for sealing leaks caused by corrosion in pipe lines buried in the soil as well as in the joints. In cases where bell and spigot joints for example are packed with caulked jute or other fibrous materials they tend to dry out and cause leaks especially when the pipe lines are used to convey natural fuel gas which is extremely dry. Fuel gas lines buried underground in cities are also subjected to earth heaving and vibration caused by vehicles and trucks of the street traffic which produce leaks at the joints. The repair of such leaks is very costly because sections of the gas main must be exposed by excavating the superposed soil to gain access to the leaking joints for resealing them. According to the present invention excavations are entirely eliminated. The section of the pipe line in which a leak exists is first dried internally by passing a stream of dry gas such as nitrogen. The sealant composition is then fed in a suitable gas vehicle through this section of the pipe line for a sufficient time until the leak is sealed. The sealant compositions of the present invention upon escape from leaks in such underground pipe lines react with moisture and oxygen present at the situs of the leak to form a solid complex reaction product and at the same time the adjacent soil provides a reinforcing matrix for the seal. Such seals are impervious to fuel gas and are strong enough to withstand high pressures.

What is claimed is:

1. A sealant composition consisting essentially of a mixture of (1) a volatilizable metal alkyl compound and (2) a volatilizable organo-silane compound, the proportion of said metal alkyl compound ranging from about 1% to about 99% by volume of said mixture, wherein the (1) volatilizable metal alkyl compound is selected from the group consisting of a compound of the formula: MRR', wherein M is zinc or cadminum, and R and R' is a straight or branched chain alkyl hydrocarbon having 1 to 3 carbon atoms, the alkyl hydrocarbons being identical or different; and a compound of the formula: $X(R)_3$, wherein X is aluminum, gallium, indium or thallium and R is a straight or branched chain alkyl hydrocarbon having 1 to 3 carbon atoms, the alkyl hydrocarbons being identical or different; and wherein the (2) volatilizable organo-silane compound has the formula: $R_{4-n}Si(OR')_n$, wherein R and R' is a straight or branched chain alkyl hydrocarbon having 1 to 3 carbon atoms, the alkyl hydrocarbons R' being identical or different, and $n$ is an integer 1 to 4.

2. The sealant composition as defined in claim 1 wherein the sealant composition comprises diethyl zinc and tetraethoxy silane.

3. A sealant composition as defined in claim 1 wherein the sealant composition comprises diethyl zinc and dimethyl diethoxy silane.

4. A sealant composition as defined in claim 1 wherein the sealant composition comprises diethyl zinc and n-propyl trimethoxy silane.

5. A sealant composition as defined in claim 1 wherein the sealant composition comprises diethyl zinc and diisopropoxy dimethoxy silane.

6. A sealant composition as defined in claim 1 wherein the sealant composition comprises diethyl zinc and trimethyl ethoxy silane.

7. A sealant composition as defined in claim 1 wherein the sealant composition comprises triethyl aluminum and tetraethoxy silane.

8. A sealant composition as defined in claim 1 wherein the sealant composition comprises triethyl aluminum and dimethyl diethoxy silane.

9. A sealant composition as defined in claim 1 wherein the sealant composition comprises triethyl aluminum and n-propyl trimethoxy silane.

References Cited

UNITED STATES PATENTS

| 3,346,662 | 10/1967 | Antonsen | 252—431 R |
| 3,578,479 | 5/1971 | Packo | 117—2 |

FOREIGN PATENTS

| 1,055,720 | 4/1959 | Germany | 252—372 |

OTHER REFERENCES

Chemical Abstracts, 55:11278b+C (for German Pat. Nos. 1,055,721 and 1,055,722).

JOAN B. EVANS, Primary Examiner

U.S. Cl. X.R.

106—287 R, 287 SE, 287 SB; 117—2, 107.2, 135.1; 252—305, 372; 260—448, 448.8